United States Patent [19]

Osgerby

[11] B 4,000,477
[45] Dec. 28, 1976

[54] RECIRCULATION OR STIRRED REACTOR FLOW LASER

[75] Inventor: Ian T. Osgerby, Nashville, Tenn.

[73] Assignee: The United States of America as represented by the Secretary of the Air Force, Washington, D.C.

[22] Filed: Feb. 13, 1974

[21] Appl. No.: 442,295

[44] Published under the second Trial Voluntary Protest Program on March 16, 1976 as document No. B 442,295.

[52] U.S. Cl. .......................... 331/94.5 G; 330/4.3; 331/94.5 D
[51] Int. Cl.² .......................................... H01S 3/22
[58] Field of Search .................... 331/94.5; 330/4.3

[56] References Cited

UNITED STATES PATENTS

| 3,720,885 | 3/1973 | Koloc | 331/94.5 G |
| 3,842,363 | 10/1974 | Dobrzelcki et al. | 331/94.5 G |

OTHER PUBLICATIONS

Spencer et al., J. of Applied Physics, vol. 43, No. 3, Mar. 1972, pp. 1151–1157.

Primary Examiner—Robert J. Webster
Attorney, Agent, or Firm—Joseph E. Rusz; Arsen Tashjian

[57] ABSTRACT

A laser which obtains lasing action from gases flowing into and out of a laser cavity is substantially improved by causing the flowing gases to traverse a strongly recirculating flow field. The recirculation of exhaust flow gases into the incoming flow gases, in a controlled recirculation region, leads to substantially uniform distribution of gas composition, chemical and thermodynamic states, pressure, temperature, density and refractive index throughout the cavity. Recirculation flow fields are generated by opposed jets, behind baffles, in swirling flow, in spheres when jet velocities are high and in duct flows where a high momentum, high velocity jet is surrounded by a co-flowing low momentum low velocity stream.

6 Claims, 3 Drawing Figures

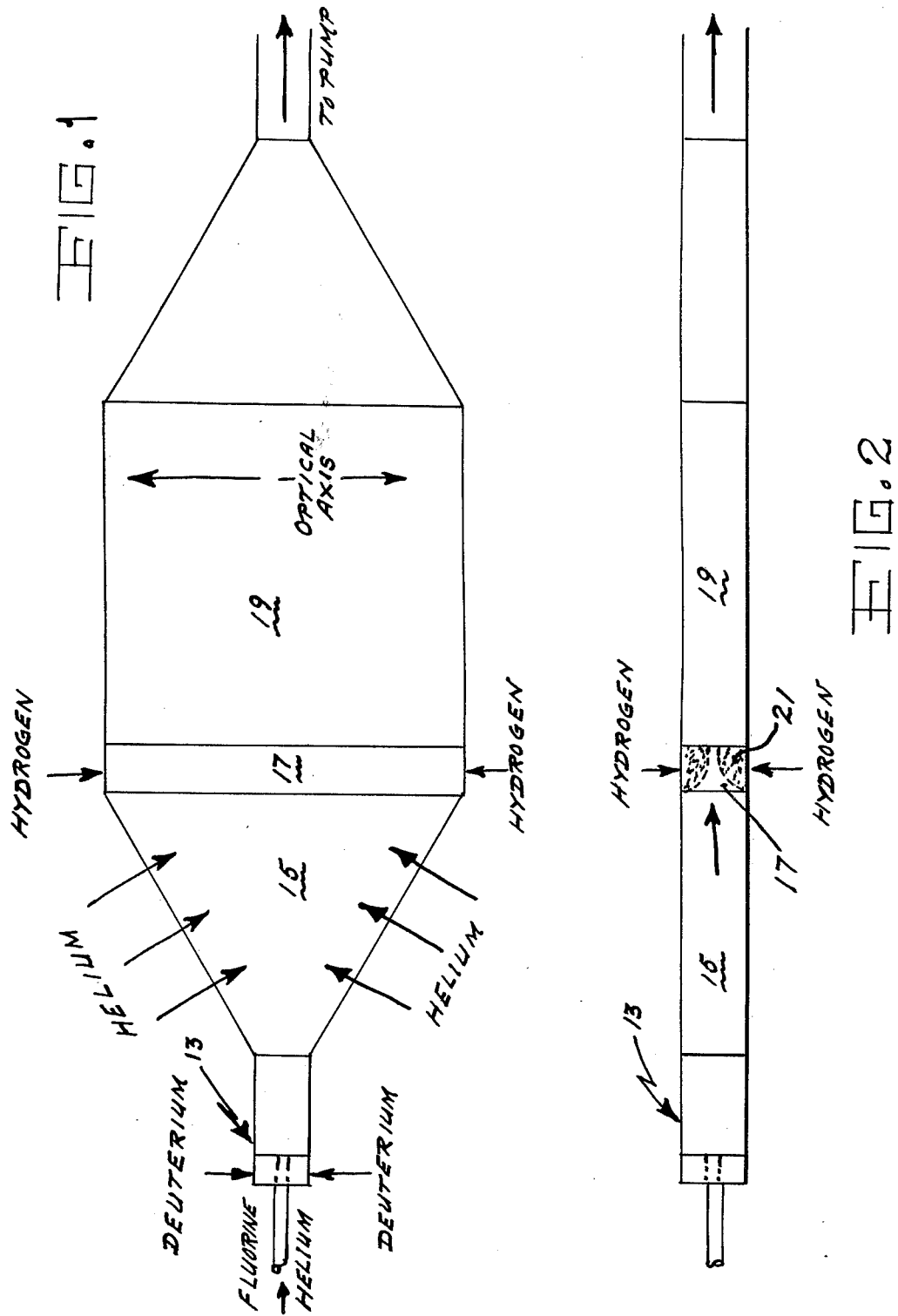

RECIRCULATION OR STIRRED REACTOR FLOW LASER

BACKGROUND OF THE DISCLOSURE

This invention relates to lasers and, more particularly, the invention is concerned with providing a stirred reactor flow laser having a high degree of uniformity of the flowing gases both in chemical composition and thermodynamic state.

A problem of paramount interest in all lasers in which the active lasing medium is continuously flowed past the cavity mirrors is to provide a uniform distribution of lasing molecules, gas pressure, temperature, density and refactive index. A very common problem in lasers which employ nozzles or other flow dividers just upstream of the cavity is due to the finite thickness of the nozzle exit lip or wall divider exit lip. This finite lip thickness causes a base flow recirculation immediately downstream of the lip which serves as a source of molecules, which may be partially or totally thermally equilibrated, which subsequently leave and mix with freshly created excited molecules and reduce the local laser power in the laser cavity. In supersonic flow lasers, viscous boundary layers, mismatched nozzle exit pressures, and presence of the above mentioned lips lead to shock wave generation and additional refractive index gradients. Flow lasers in which the constituent reactants cannot be premixed, may have significant non-uniformities of gas composition, temperature, pressure, density and refractive index in addition to the above.

This invention provides the means for generating a uniform distribution of lasing gas molecules, lasing molecule states, pressure, temperature, density and refractive index. The uniformity will improve long range laser beam propagation and provide a unique analytical tool for experimental and theoretical development of chemical lasers and chemical laser reactants.

SUMMARY OF THE INVENTION

The invention primarily concerns the class of fluid flows called, "Ducted turbulent flows with extensive recirculation," and includes the stirred reactor with a central jet, the opposed reacting jet as well as ducted flows with jets surrounded by coflowing, low momentum streams. All such flows have a significant volume of the duct in which the flow recirculates strongly.

A property of strongly recirculating turbulent flows is the high degree of uniformity of the flowing gases both in chemical composition and thermodynamic state. This property has significant implications for lasers and forms the basis for the invention.

Accordingly, it is an object of the invention to provide a laser having an extensive recirculation flow which operates to generate an essentially uniform gas composition throughout the laser cavity at an essentially uniform pressure, temperature, density and refractive index.

Another object of the invention is to provide a laser wherein the flow is essentially premixed prior to chemical reaction even though the reactants are unmixed prior to injection into the cavity.

Still another object of the invention is to provide a laser wherein the average residence time of molecules in the cavity can be controlled by varying cavity geometry and reactant mass flow rates to find the optimum for laser performance.

A further object of the invention is to provide a laser wherein subsonic flow eliminates shock waves and pressure disturbances with their concomitant density gradients and refractive index gradients.

A still further object of the invention is to provide a laser wherein the essentially uniform refractive index in the cavity reduces refraction/diffraction losses to a minimum and provides a laser with inherently good beam quality.

These and other objects, features and advantages will become more apparent after considering the following description taken in conjunction with the annexed drawings and appended claims.

BRIEF DESCRIPTION OF THE DRAWINGS

FIG. 1 is a top view in schematic of a stirred reactor cavity according to the invention showing the combustor section, cavity, diffuser section and outlet to pump;

FIG. 2 is a side view in schematic of the stirred reactor cavity of FIG. 1; and

DESCRIPTION OF A PREFERRED EMBODIMENT

Figure 3:
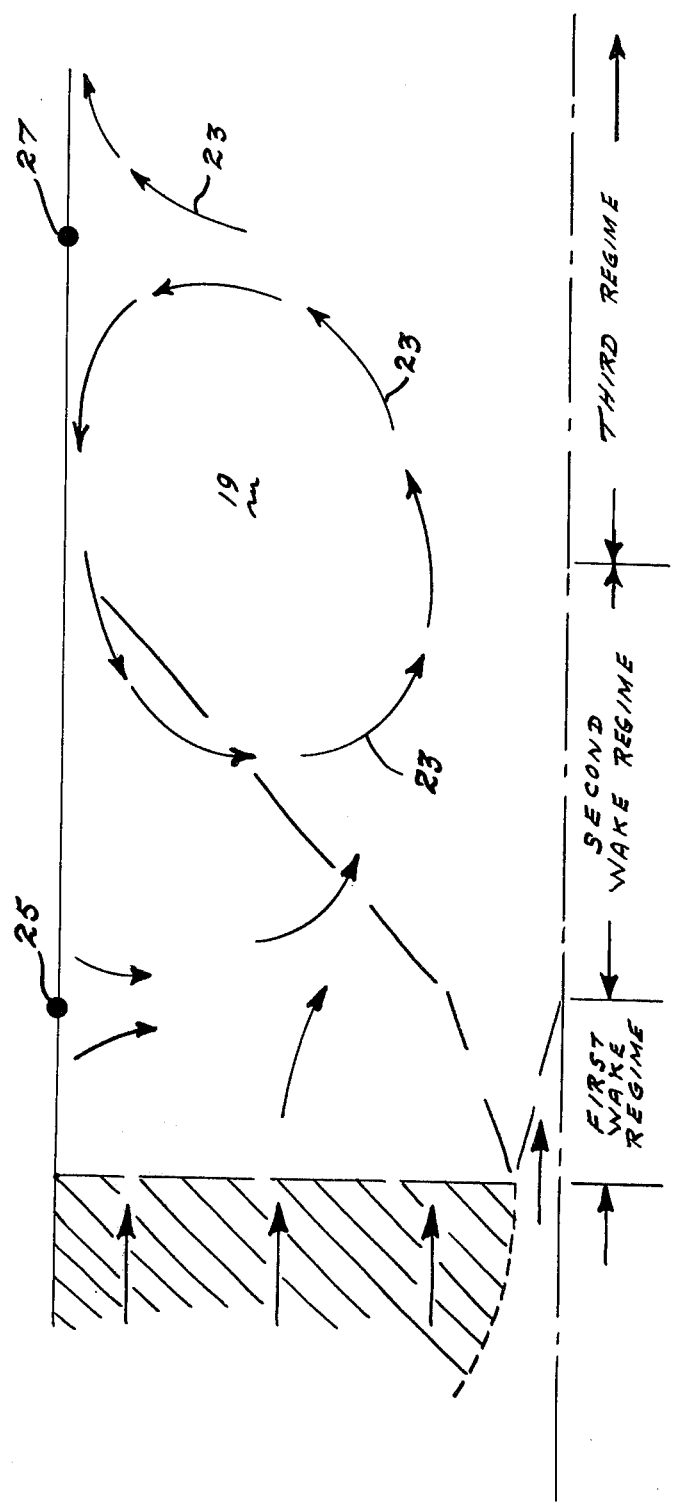
FIG. 3 is an enlarged side view in schematic showing the flow directions in a recirculating duct flow in the region of the sonic orifice and cavity.

Referring now to the drawings, there is shown in schematic form a preferred embodiment of a recirculation or stirred reactor flow laser according to the invention. In FIG. 1, which is a top view of the cavity, there is shown a combustor section 13 in which the fluorine atoms are generated by combustion of deuterium and fluorine with helium as a diluent. This is followed by a volume expansion chamber 15 in which cold helium is added to freeze any chemical recombination of fluorine atoms. The mixture then flows through a sonic orifice 17 into the cavity 19. Cold hydrogen is injected via a plenum consisting of porous metal or wire mesh at low velocity into the flow area several times that of the sonic jet.

In FIG. 3, the hydrogen stream and jet flow mix and recirculate according to the flow pattern shown by the arrows 23. The recirculation region lies between the designated upstream stagnation point 25 and downstream stagnation point 27. The gas flows leave the stirred cavity 19 and pass into a diffuser and exhaust pump system for disposal. The optical laser cavity consists of mirrors (not shown) on either side of the stirred cavity 19 which has windows on each side.

The uniform distribution of lasing molecules is generated by means of extensive recirculation and the degree of chemical reaction in the recirculation flow is controlled by the geometry of the cavity and the reactant flow rates. The chemical reaction rates can be investigated for arbitrary chemical reactants in the recirculation flow so that different chemical systems are evaluated for superiority in the recirculation flow. The lasing molecules are generated or maintained in a recirculation flow which forms the substantial active volume of the cavity and the recirculating flows operate to generate an essentially uniform distribution of chemical and thermodynamic states of molecules in a laser cavity.

Although the invention has been illustrated in the accompanying drawings in terms of a preferred embodiment thereof, the invention is not limited to this embodiment or to the particular configuration mentioned. It will be apparent to those skilled in the art that the hereinbefore described stirred reactor cavity for a chemical laser is shown in two-dimensional configuration though the device is not limited to this. Also, it should be noted that the device is not limited to the hydrogen/fluorine/helium chemical system disclosed and that other chemical systems can be evaluated using all or part of the disclosed structural arrangement.

Having thus set forth and disclosed the nature of my invention, what I claim and desire to secure by letters Patent of the United States is:

1. In a chemical reaction subsonic flow type laser for producing a uniform mixture of active laser gas molecules, the improvement comprising:

a combustor section for generating excited gas atoms therein and a flow of said atoms therefrom, a volume expansion chamber adjacent and downstream from said combustor section for expanding said gas atoms, means in the wall of said expansion chamber for adding a diluent to said excited gas atoms, a relatively small diameter sonic orifice adjacent and downstream of said expansion chamber, a reaction cavity, means for flowing said gas atoms through the sonic orifice to create a high velocity flow through said orifice into the reaction cavity, plenum means comprising a porous metallic structure about said sonic orifice for injecting a cold diluent at a low velocity into the gas flow in the relatively large flow area about the sonic orifice for setting up a low momentum relatively large area flow of cold reactant gas about a relatively small area high momentum flow of excited gas atoms for setting up a strong recirculating flow of said excited atoms and cold gas downstream of the sonic orifice in said reactor cavity for creating a uniformly distributed mixture of active laser gas reactant molecules, the region of said recirculating flow lying between upstream and downstream stagnation points which lie within said reaction cavity.

2. The chemical laser having the improved stirred reactor cavity defined in claim 1 wherein said combustor section includes means for simultaneously introducing fluorine in an axial flow direction thereinto and deuterium in a transverse direction thereinto to produce combustion, thereby generating fluorine atoms in said combustor.

3. The chemical laser having the improved stirred reactor cavity defined in claim 2 wherein the diluent added to the fluorine atoms in said volume expansion chamber is cold helium, thereby freezing any chemical recombination of fluorine atoms.

4. The chemical laser having the improved stirred reactor cavity defined in claim 3 wherein said plenum comprises porous metal.

5. The chemical laser having the improved stirred reactor cavity defined in claim 3 wherein said plenum comprises wire mesh.

6. The chemical laser having the improved stirred reactor cavity defined in claim 3 wherein the cold gas injected into the stream of gas molecules at said sonic orifice is hydrogen.

* * * * *